Patented May 12, 1931

1,805,162

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

PREPARATION OF ALIPHATIC ACID CHLORIDES

No Drawing. Application filed October 11, 1928. Serial No. 311,972.

The present invention relates to methods for the preparation of aliphatic acid chlorides or substituted derivatives thereof, and more particularly to methods wherein the corresponding acid is reacted with a chloride of sulphur and chlorine.

The familiar method for preparing acid chlorides employs chlorides of phosphorus to react upon the corresponding acid, but for commercial operations such method suffers from the disadvantage of high cost of the phosphorus compound and the necessity of recovering same from the reaction product. It has, therefore, been proposed to substitute the cheaper chlorides of sulphur in reactions of the present type. For example, Behal and Auger (Bull. Soc. Chim. (3) 2—144: 1889) reacted between acetic acid and sulphur tetrachloride, $SCl_4$, at a low temperature, obtaining thereby acetyl chloride, according to the equation:

(1) $SCl_4 + 2CH_3COOH \rightarrow SO_2 + 2CH_3COCl + 2HCl$

The aforesaid method has failed to find practical application, however, due to the very low temperature that must be maintained to avoid decomposition of the unstable $SCl_4$. The latter dissociates completely to $SCl_2$ and $Cl_2$ at a temperature of about $-30°$ C. Furthermore the product of the reaction is contaminated by sulphur compounds which are extremely difficult of removal by the usual methods of purification. Such sulphur compounds, for example sulphuryl chloride, $SO_2Cl_2$, are also able to chlorinate the alkyl group of the acid chloride, thereby introducing chlorinated derivatives as further impurities and giving rise to a lower yield of principal product.

I have discovered that the foregoing reaction is greatly facilitated when conducted in the presence of various anhydrous metallic chlorides as catalyst, whereby the reactive sulphur compound is stabilized, enabling the reaction to be carried out at a considerably higher temperature, and furthermore troublesome side-reactions are obviated and a product substantially free from sulphur compounds is obtained directly.

To the accomplishment of the foregoing and related ends, the invention, then, consists of the procedure hereinafter fully described and particularly pointed out in the claims, the following description setting forth, however, but a few of the various ways in which the principle of the invention may be used.

As stated above, sulphur tetrachloride, $SCl_4$, is completely dissociated at a temperature of about $-30°$ C. However, the aforesaid compound has been found to form stable double compounds with certain anhydrous metallic chlorides, such as $SbCl_5$, $SnCl_4$, $FeCl_3$, $AlCl_3$, etc. (Ruff, Ber. 37, 4513). Such double compounds not only remain undecomposed at ordinary temperatures, but also may be readily formed at such temperatures, when Chlorine is passed into the more stable lower chlorides of sulphur, $S_2Cl_2$ and $SCl_2$, in the presence of one or more of the above metallic chlorides. In fact, I have found that it is not even necessary to introduce the metallic chloride as such, since it may be formed in situ by the action of chlorine upon the metal itself, or its oxide, whereupon it enters upon the formation of the double compound with $SCl_4$.

It follows from the foregoing observed facts that an acid chloride may be produced from the corresponding acid, in accordance with Equation (1), when chlorine is introduced into a mixture of sulphur monochloride, $S_2Cl_2$, or dichloride, $SCl_2$, and organic acid in the presence of a metal, such as iron, the latter being permissibly employed only in catalytic amount. The equations for such reactions when sulphur monochloride is used may be expressed as follows, wherein R represents an aliphatic radical:

(2) $2Fe + 3Cl_2 \rightarrow 2FeCl_3$
(3) $S_2Cl_2 + 2FeCl_3 + 3Cl_2 \rightarrow 2SCl_4.FeCl_3$
(4) $2[SCl_4·FeCl_3 + 2RCOOH \rightarrow 2RCOCl + SO_2 + 2HCl + FeCl_3]$.

It will be noted that the metallic chloride, e. g., $FeCl_3$, is liberated as in Equation (4) and is then available to form additional double compound as in Equation (3). Consequently a relatively small, or catalytic, amount thereof suffices for the production of an indefinite quantity of acid chloride. As regards the actual consumption of raw materials the following equation represents the initial and final stages of the present method, viz:—

(5) $S_2Cl_2 + 3Cl_2 + 4RCOOH \rightarrow 4RCOCl + 2SO_2 + 4HCl$

A further advantage accruing from the presence of the metallic chloride catalyst lies in the fact that it either inhibits the formation of sulphuryl chloride, $SO_2Cl_2$, which tends to form by combination of $SO_2$ and $Cl_2$, or at least brings about its decomposition as rapidly as it is formed. Such sulphuryl chloride is an undesirable by-product, when formed in the present reaction, inasmuch as it is difficult to separate from the reaction product by the usual methods of distillation, and furthermore, when present, acts as chlorinating agent for chlorinating the aliphatic radical of the acid chloride, thus introducing additional impurities into the final product and reducing the yield of principal product. The aforesaid catalyst promotes the following reactions between $SO_2Cl_2$ and sulphur or sulphur chlorides:

(6) $2S + SO_2Cl_2 \rightarrow SO_2 + Cl_2$
(7) $S_2Cl_2 + SO_2Cl_2 \rightarrow SO_2 + 2SCl_2$
(8) $SCl_2 + SO_2Cl_2 \rightarrow SO_2 + SCl_4$ Since the lower chlorides of sulphur are always present in the reaction mixture, the simultaneous existence of sulphuryl chloride therewith is almost completely excluded, and the reaction proceeds smoothly in accordance with the principal Equation (5) with formation of a minimum of undesirable by-products or impurities, when the above catalyst is used.

In general the procedure for carrying out my improved method consists in mixing an aliphatic acid, or substituted derivative thereof, and sulphur chloride of known S and Cl content in the ratio of one equivalent of sulphur to two of the acid, with addition of approximately 0.5 to one per cent. iron filings. Chlorine is then passed in until the calculated amount thereof sufficient to form $SCl_4$ has been added. The temperature is to be regulated at such point as to prevent loss of reaction product by vaporization. Owing to the fact that large volumes of HCl and $SO_2$ are evolved, there is a tendency for such gaseous products to entrain and carry off appreciable quantities of acid chloride vapors, particularly in the case of those of lower boiling point, such as acetyl chloride. Consequently it is well to maintain the reaction temperature materially below the boiling point of the acid chloride product, and also to provide the reaction vessel with a suitable reflux condenser. Except in the case of the more volatile acid chlorides, however, for which a lower reaction temperature is necessary, the preferred reaction temperature is in the neighborhood of 50° to 60° C.

By way of illustration, the following examples are given, but it will be understood that such examples are not to be considered as a limitation upon my invention.

*Example 1*

1200 grams mono-chloracetic acid were mixed with 450 grams $S_2Cl_2$ and 2 grams iron filings, and chlorine passed in at a temperature of 50°–60° C. When 2 lbs. 3 oz. chlorine had been absorbed, 100 grams more $S_2Cl_2$ were added, and 7 oz. more chlorine. The reaction product upon fractionation gave 1180 grams chloracetyl chloride, $ClCH_2COCl$, and 213 grams lower boiling material containing only 1 per cent. $SO_2Cl_2$. Yield 82 per cent. based upon chloracetic acid taken.

*Example 2*

A mixture of 120 grams glacial acetic acid, 100 grams $S_2Cl_2$ and 2 grams iron filings was cooled to $-19°$ C., and 9 oz. chlorine passed in, keeping the temperature below $-4°$ C. The reaction mixture was allowed to stand at 0° C. for 10 hours, and then fractionally distilled. Yield 150 grams acetyl chloride amounting to 95.5 per cent. of theory.

Similarly, I may prepare the acid chlorides of propionic, butyric, valeric and homologous aliphatic acids, as well as of their substitution products, such as the halogen substituted derivatives thereof. While I have employed iron filings in the above examples for the purpose of supplying the anhydrous metallic chloride catalyst through reaction with chlorine, I may likewise make use of ferric chloride or other anhydrous metallic chlorides of the character described, either as such or formed in situ from the respective metals and chlorine.

In the following claims the term "acid chloride" is understood to include the above designated substituted derivatives thereof.

Other modes of applying the principle of my invention may be employed instead of those explained, change being made as regards the process herein disclosed, provided the means stated by any of the following claims or the equivalent of such stated means be employed.

I therefore particularly point out and distinctly claim as my invention:—

1. The method of making an aliphatic acid chloride, which comprises reacting between the corresponding acid and sulphur tetrachloride in the presence of an anhydrous metallic chloride which is capable of forming a substantially stable double compounds with sulfur tetrachloride.

2. The method of making an aliphatic acid chloride, which comprises introducing chlorine into a mixture of the corresponding acid and a lower chloride of sulphur in the presence of an anhydrous metallic chloride which is capable of forming a substantially stable double compound with sulfur tetrachloride.

3. The method of making an aliphatic acid chloride, which comprises introducing chlorine into a mixture of the corresponding acid and sulphur mono-chloride in the presence of an anhydrous metallic chloride which is capable of forming a substantially stable double compound with sulfur tetrachloride.

4. The method of making an aliphatic acid chloride, which comprises reacting between the corresponding acid and sulphur tetrachloride in the presence of anhydrous ferric chloride.

5. The method of making an aliphatic acid chloride, which comprises introducing chlorine into a mixture of the corresponding acid and a lower chloride of sulphur in the presence of anhydrous ferric chloride.

6. The method of making an aliphatic acid chloride, which comprises introducing chlorine into a mixture of the corresponding acid and sulphur mono-chloride in the presence of anhydrous ferric chloride.

7. The method of making acetyl chloride, which comprises reacting between glacial acetic acid and sulphur tetrachloride in the presence of an anhydrous metallic chloride which is capable of forming a substantially stable double compound with sulfur tetrachloride.

8. The method of making acetyl chloride, which comprises introducing chlorine into a mixture of glacial acetic acid and sulphur mono-chloride in the presence of an anhydrous metallic chloride which is capable of forming a substantially stable double compound with sulfur tetrachloride.

9. The method of making acetyl chloride, which comprises reacting between glacial acetic acid and sulphur tetrachloride in the presence of anhydrous ferric chloride.

10. The method of making acetyl chloride, which comprises introducing chlorine into a mixture of glacial acetic acid and sulphur mono-chloride in the presence of anhydrous ferric chloride.

11. The method of making acetyl chloride, which comprises introducing chlorine into a mixture of glacial acetic acid and sulphur mono-chloride in the presence of anhydrous ferric chloride at a temperature between 0° and −20° C.

12. The method of making acetyl chloride, which comprises adding a relatively small amount of metallic iron to a mixture of glacial acetic acid and sulphur mono-chloride and introducing chlorine, while maintaining the reaction temperature between 0° and −20° C.

13. The method of making acetyl chloride, which comprises adding a relatively small amount of metallic iron to a mixture of glacial acetic acid and sulphur mono-chloride and introducing chlorine in amount theoretically sufficient to convert such mono-chloride completely to sulphur tetrachloride, while maintaining the reaction temperature between 0° and −20° C.

14. The method of making chloracetyl chloride which comprises introducing chlorine into a mixture of mono-chlor acetic acid and sulphur mono-chloride in the presence of anhydrous ferric chloride at a temperature of approximately 50° to 60° C.

15. The method of making chloracetyl chloride which comprises adding a relatively small amount of metallic iron to a mixture of mono-chlor acetic acid and sulphur monochloride and introducing chlorine thereto, while maintaining the reaction temperature at approximately 50° to 60° C.

Signed by me this 8th day of October, 1928.

EDGAR C. BRITTON.

Certificate of Correction

Patent No. 1,805,162.   Granted May 12, 1931, to
EDGAR C. BRITTON

It is hereby certified that error appears in the printed specification of the above-numbered patent requiring correction as follows: Page 2, line 26, strike out equation 6 and insert instead $2S + SO_2Cl_2 \rightarrow SO_2 + S_2Cl_2$ and that the said Letters Patent should be read with this correction therein that the same may conform to the record of the case in the Patent Office.

Signed and sealed this 4th day of August, A. D. 1931.

[SEAL.]

WM. A. KINNAN,
*Acting Commissioner of Patents.*